UNITED STATES PATENT OFFICE.

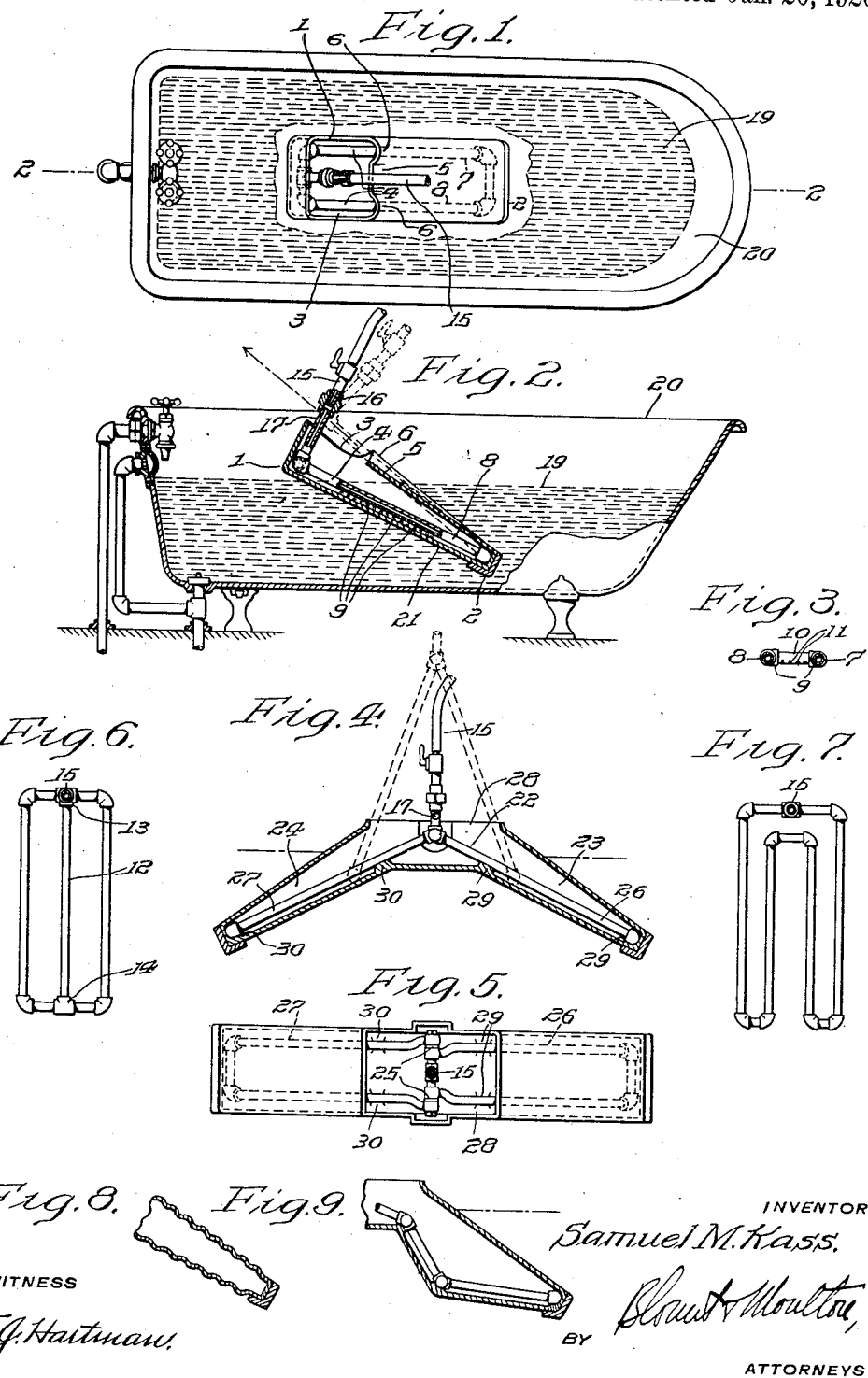

SAMUEL M. KASS, OF PHILADELPHIA, PENNSYLVANIA.

FLOATING HEATER.

1,328,630.  Specification of Letters Patent.  Patented Jan. 20, 1920.

Application filed January 16, 1919. Serial No. 271,347.

*To all whom it may concern:*

Be it known that I, SAMUEL M. KASS, a citizen of the United States, and a resident of the city of Philadelphia, county of Philadelphia, and State of Pennsylvania, have invented certain new and useful Improvements in Floating Heaters, of which the following is a specification.

My invention relates to a novel and useful heater adapted, in one of its uses, to float in a container of liquid, such as a bathtub of water, and to heat the contents thereof.

The main object, in its broadest aspect, of my invention is to provide a means capable of heating liquids in containers such as bathtubs, laundry tubs, and the like.

Another object is to provide a means that is self-contained, readily placeable in a container and also readily connected to the heat or fuel source that is usually supplied to buildings in general, such as dwellings, shops, stores, and so forth.

A further object is to provide a heating means that will float in the liquid to be heated whereby direct application of the heat is attained.

A still further object is to provide means for presenting a substantially large heating surface of the heater to the liquid to be heated.

And further objects will appear from the following description and appended claims.

Referring more particularly to the accompanying drawing, illustrating several embodiments of my invention Figure 1 is a top plan view of my floating heater located in a bath-tub of water;

Fig. 2 shows a vertical section through the same on line 2—2 of Fig. 1;

Fig. 3 is a sectional view of one form of heating coil or burner;

Fig. 4 is a sectional view of another form of my invention;

Fig. 5 is a top plan view of the heater shown in Fig. 4;

Figs. 6 and 7 are illustrations of certain forms of heating coils or burners that may be used in any of the embodiments disclosed;

Figs. 8 and 9 are detail views of modified forms of the float illustrating the increased heating surface feature.

The invention comprises mainly a chamber 1, composed of any suitable heat conducting material, as a metal, and preferably of copper or galvanized iron. It is, of course, understood that the chamber may be made of any other material such as enamel ware, tin, iron, steel, and so forth.

The chamber is of preferably wedge-shape and weighted at the small end by a weight 2, which may be of lead or of cast iron, or the like. At the larger end of the chamber there is provided an opening 3 through which a burner or heating coil 4 may be inserted into the chamber. The wall 5 is provided with raised or arched portions 6 for the purpose of facilitating the insertion and the withdrawal of the burner, as is clearly shown in dotted lines in Fig. 2.

The burner or heating coil is preferably made up of pipe sections joined together by the usual piper's fittings, and it may be of any form desired. In Figs. 1 and 2 is shown a burner of rectangular form, with but two burner legs 7 and 8 in which are provided a series of gas jet openings or perforations 9. These perforations are located so as to cause the gas flame to impinge upon the adjacent wall of the chamber for the purpose of more directly applying the heat to the wall, and hence the liquid. These burner legs 7 and 8 may be connected at the ends by a cross piece 10 which may be also provided with perforations 11 relatively located as described above in respect to the perforations 9. If desired, another leg 12 may be added between those (7 and 8) shown in Figs. 1 and 2, and connected by proper fittings 13 and 14 as shown in Fig. 6 to produce the form of burner shown in the latter figure. It is to be understood that all these legs may be provided with perforations as described above in connection with the form of burner shown in Figs. 1 and 2.

The burner may also be provided with an inlet pipe 15 in which may be located a nozzle 16. An opening 17 may also be cut in the pipe 15 adjacent the nozzle 16 for the entrance of air to be mixed with the gas emitted through the nozzle 16, thereby forming the well known Bunsen type of burner. A hand controlled valve 18 may further be included in the pipe 15 for regulating the amount of gas supplied to the burner.

In use, the chamber 1 is placed in the liquid 19 in a bath-tub, or other container, so that the weighted end of the chamber will depend in the liquid whereby two surfaces 5 and 21 are presented in contact with the liquid. This offers a relatively large area of heating surface. The chamber floats in the liquid with the opening 3 above the surface level thereof as clearly shown in Fig. 2. The burner may be inserted through said opening and reposed in position within the chamber, as shown in full lines in Fig. 2, whereby the flame jets, at the perforations 9 and 11, are directed toward or impinge upon the bottom surface 21, while the upward flowing hot gases contact against the upper face or wall 5, as well as the side walls of the chamber. In this way, a heating surface of large area is attained. The opening 3 aside from presenting a means through which the heating coil or burner may be inserted or withdrawn, also is an expedient for the escape of the gases of combustion from the chamber.

In Figs. 4 and 5 is shown a chamber 22 of duplex form made up of the chamber portions 23 and 24 of the same general construction as described above in relation to the form of device shown in Figs. 1 and 2. The heating coil in this form of heating means may be provided with hinged fittings 25 in order that the burner sections 26 and 27 may be readily withdrawn through the opening 28 in the top of the duplex chamber 22 as is clearly shown in dotted lines in Fig. 4. The chamber portions 23 and 24 may further be furnished with lugs 29 and 30 upon which the burner legs may rest at a proper distance from the bottom walls of the chamber portions. This burner, is otherwise, provided with flame perforations and the Bunsen burner feature as described above in connection with the form of means shown in Figs. 1 and 2.

In Fig. 7 is shown another form of burner or heating coil with four legs. It is understood that the shape and design of the heating coil may be of any form desired to suit the particular circumstances met with or the pattern of the chamber used.

In Figs. 8 and 9 are shown further changed configurations of the chamber or chamber portions with increased surface area in order to present greater heating surface, Fig. 8 showing the idea of shaping such surface into corrugated form and Fig. 9 shows the bottom of the chamber in the form of an obtuse angle.

It is to be understood that while I preferably utilize gas as a fuel, I may make use of any other form of fuel, such as oil, kerosene, gasolene, naphtha, or any suitable gaseous or liquid fuel capable of combustion in the form of burner disclosed above, whether it be in a gaseous, vaporous, atomized, or any other like suitable form or condition for the purposes disclosed.

Having thus fully described my invention, I claim:

1. A heater comprising a chamber weighted at one end and adapted to float in an inclined position in a liquid to be heated, and a heating means in said chamber adapted to convey its heat to the liquid through the chamber.

2. A heater comprising a chamber adapted to float in a liquid to be heated, a heating coil insertible in said chamber, and means to position said chamber in an inclined position in said liquid so as to present an abnormally large heating surface.

3. A heating device comprising an elongated tapered chamber provided with an opening at one end thereof and adapted to float in a liquid to be heated, a weight secured at the other end thereof whereby the chamber may float with the weighted end submerged in the liquid and the open end above the surface level of the liquid, a heating device, insertible through said opening, located in said chamber adjacent a wall thereof for heating the same, and means for aiding the ready insertion and withdrawal of said heating device in and from said chamber.

In witness whereof, I have hereunto set my hand this 6th day of December, 1918.

SAMUEL M. KASS.